(12) United States Patent
Chung et al.

(10) Patent No.: US 8,660,343 B2
(45) Date of Patent: Feb. 25, 2014

(54) SYSTEM AND METHOD OF DETECTING ABNORMAL SEGMENTS OF VIDEO

(75) Inventors: Yi-Hua Chung, New Taipei (TW); Shih-Fang Wong, New Taipei (TW); Xin Lu, Shenzhen (CN); Yu-Yong Zhang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 10 days.

(21) Appl. No.: 13/483,063

(22) Filed: May 30, 2012

(65) Prior Publication Data

US 2013/0142425 A1 Jun. 6, 2013

(30) Foreign Application Priority Data

Dec. 2, 2011 (CN) .......................... 2011 1 0395987

(51) Int. Cl.
*G06K 9/46* (2006.01)

(52) U.S. Cl.
USPC .......................................................... 382/164

(58) Field of Classification Search
USPC .......................... 382/164, 168, 170, 173, 100
See application file for complete search history.

(56) References Cited

U.S. PATENT DOCUMENTS 5,757,287 A * 5/1998 Kitamura et al. ............. 340/937
2007/0291991 A1* 12/2007 Otsu et al. .................... 382/104

\* cited by examiner

*Primary Examiner* — Yon Couso
(74) *Attorney, Agent, or Firm* — Altis Law Group, Inc.

(57) ABSTRACT

A system and a method of detecting abnormal or security-significant segments of a video are provided. The video is divided into several segments. A set of features of each segment of the video is extracted in order to calculate a set of factors corresponding to each segment. A value deemed abnormal of each segment is calculated according to the set of factors corresponding to each segment. One or more abnormal segments are determined from the segments based on the abnormal values. The set of features includes a color variable feature, a movement variable feature, a movement variable ratio feature and a background variable feature.

6 Claims, 2 Drawing Sheets

SYSTEM AND METHOD OF DETECTING ABNORMAL SEGMENTS OF VIDEO

BACKGROUND

1. Technical Field

The present disclosure relates to the field of video monitoring and analysis.

2. Description of Related Art

In the field of video surveillance, monitor camera may be used, but the vast amount of video data collected from the monitor cameras often include only a few parts that are useful to user. The useful parts may present one or more unusual events, and people must look over or through all the video data to find them. Since this is not efficient use of manpower, data mining can be applied to video surveillance system in order to provide a better solution.

Data mining algorithms for detecting abnormal parts of the video are broadly based on principles of model analysis or cluster analysis. Cluster analysis is more reliable, since creating models for all "normal events" is hard in model analysis. However, cluster analysis may fail to detect a change in the background of the video as a significant or noteworthy moment. That makes the degree of accuracy obviously less as long as there is a dynamic background to the video footage.

Thus, the present disclosure is to provide an improved system and method for detecting abnormal events in a video regardless of whether the video under examination has a motionless or a dynamic background.

BRIEF DESCRIPTION OF THE DRAWINGS

The components in the drawings are not necessarily drawn to scale, the emphasis instead being placed upon clearly illustrating the principles of a system and a method of detecting abnormal segments of a video. Moreover, in the drawings, like reference numerals designate corresponding parts throughout the several views.

DETAILED DESCRIPTION

Figure 1:
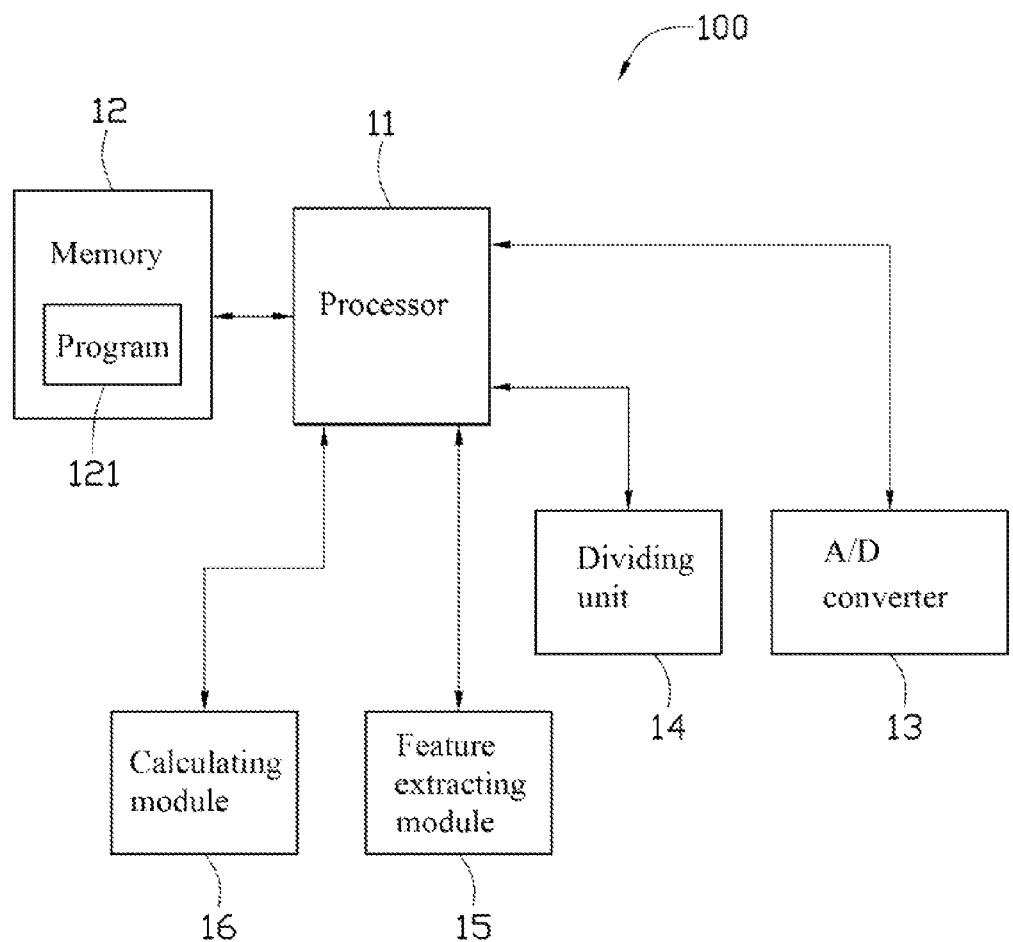
FIG. 1 is a block diagram of a system of detecting abnormal segments of a video in accordance with an exemplary embodiment of the present disclosure.

FIG. 1 is a block diagram of a computerized system 100 of detecting abnormal segments of a video in accordance with an exemplary embodiment of the present disclosure.

The computerized system 100 comprises one or more processors (CPUs) 11, a memory 12 storing one or more programs 121 that are executed by the processor 11, an analog-to-digital converter 13, a dividing unit 14, a feature extracting module 15, and a calculating module 16. The dividing unit 14 is hardware, and the feature extracting module 15 and the calculating module 16 are software. The memory 12, the analog-to-digital converter 13, the dividing unit 14, the feature extracting module 15, and the calculating module 16 are in communication with the CPU 11. The memory 12 can be flash memory, a hard disk drive, or other non-transitory storage mediums.

Although this diagram depicts components e.g. the feature extracting module 15 and the calculating module 16 as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can function on the same computing device or multiple computing devices, and multiple computing devices can be interconnected by one or more networks.

Figure 2:
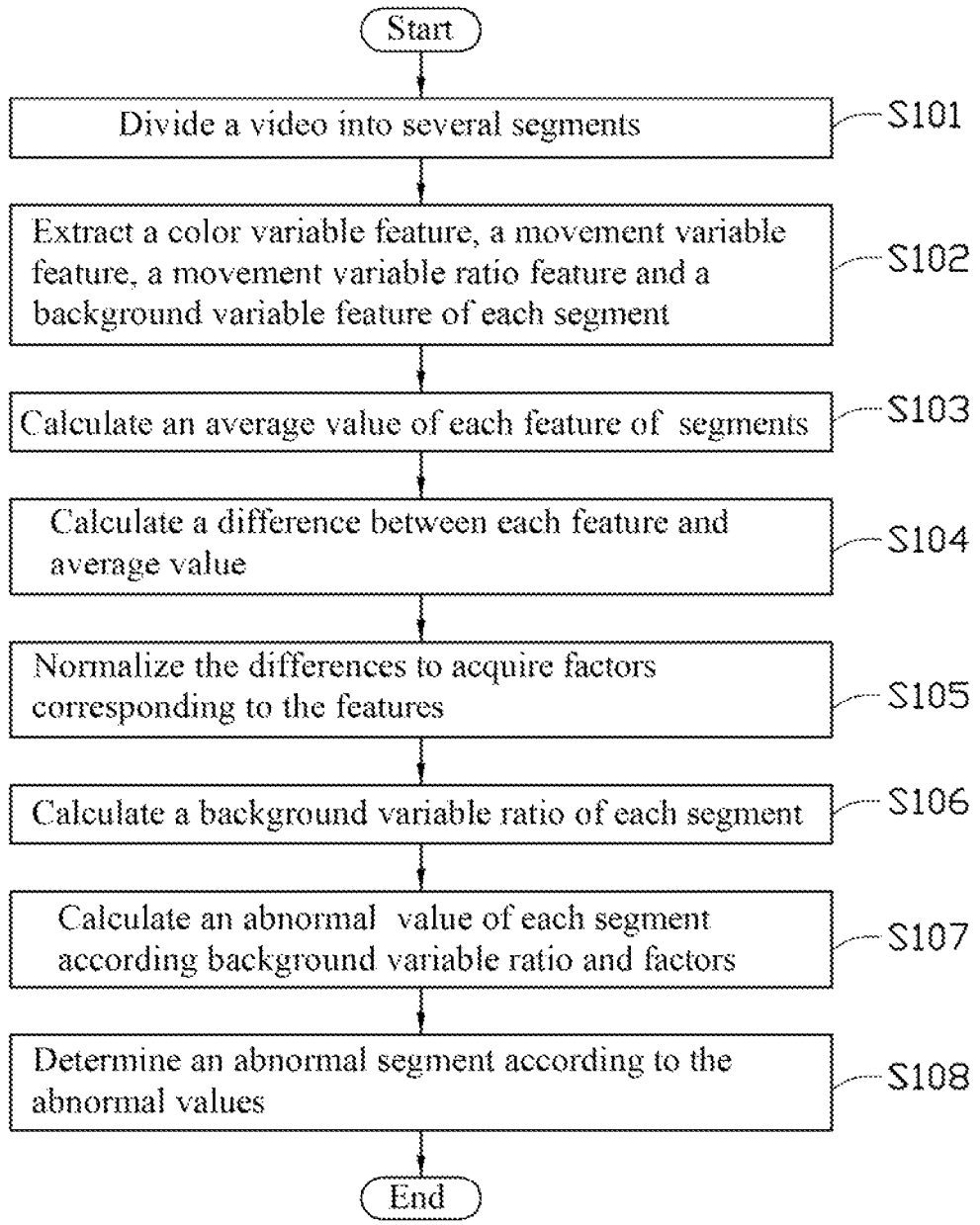
FIG. 2 is a flowchart of a method of detecting abnormal segments of a video in accordance with an exemplary embodiment of the present disclosure.

FIG. 2 is a flowchart of a method of detecting abnormal segments of a video in accordance with an exemplary embodiment of the present disclosure.

In step S101, the input of one or more videos into the system 100 is converted into digital files by the analog-to-digital converter 13. Then, the dividing unit 14 divides each video file into N segments. Each one of the N segments consists of one or more frames, and the frames may be saved in, but not limited to, an RGB color mode format. The dividing unit 14 may divide the video according to signal-disconnected points or signal singularities. Otherwise, the dividing unit 14 may divide the video into parts with equal length. Preferably, each of the segments is divided to show and isolate an independent event. An independent event may be defined as a video section having a constant background motionless and never changed.

In step S102, the feature extracting module 15 extracts a color variable feature $F_{pm}$, a movement variable feature Avesum, a movement variable ratio feature AllTwisum and a background variable feature Avesum_back of each one of the N segments.

One of the N segments is hereinafter exemplified as "the segment" for clarifying the description. In this embodiment, first, the feature extracting module 15 converts each frame of the segment into grayscale for speed of calculation. Afterwards, to extract the color variable feature $F_{pm}$ of the segment, the feature extracting module 15 parses the frames based on accumulative histogram and obtains the color variable feature $F_{pm}$ from the parsing result based on PCA (Principal Component Analysis).

To extract the movement variable feature Avesum and the movement variable ratio feature AllTwisum of the segment, the feature extracting module 15 sets a first threshold and a second threshold. Afterwards, the feature extracting module 15 utilizes differential operation to parse the frames. The first frame and the last frame of the segment are compared to generate a first differential image, and each two of continuous frames of the segment are compared to generate a second differential image. The movement variable feature Avesum relates to a sum of the pixels of the first differential image of which the gray values has exceeded the first threshold. The movement variable ratio feature AllTwisum relates to a number of times that a rate of change of each two continuous frames of the segment has exceeded the second threshold, where the rate of change is calculated based on the each of the second differential images.

To extract the background variable feature Avesum_back, the feature extracting module 15 extracts background information of each frame of the segment based on Gaussian mixture model, and sets a third threshold. Afterwards, in a manner similar to extraction of the movement variable feature Avesum, the feature extracting module 15 utilizes a differential operation to parse background information of each frame and thereby obtains a third differential image. The background variable feature Avesum_back relates to a sum of the pixels of the third differential image of which gray values has exceeded the third threshold.

The feature extracting module 15 repeats above-mentioned steps to extract a set of features of each segment of the N segments, wherein the set of features includes the color variable feature $F_{pm}$, the movement variable feature Avesum, the movement variable ratio feature AllTwisum and the background variable feature Avesum_back. Therefore, the feature extracting module 15 obtains N of the color variable features $F_{pm}$, N of the movement variable features Avesum, N of the movement variable ratio features AllTwisum and N of the background variable features Avesum_back, and sends the total of these N features to the calculating module 16.

In step S103, the calculating module 16 calculates an average from the N color variable features $F_{pm}$ of the segments to calculate a feature average value $C_{F_{PM}}$. Also, and likewise, the calculating module 16 calculates a feature average value $C_a$ of the color variable features Avesum, a feature average value $C_b$ of the color variable features AllTwisum, and a feature average value $C_c$ of the color variable features.

In step S104, in each one of the N segments, the calculating module 16 calculates any difference between each of the set of features and the corresponding feature average value.

In step S105, in each one of the N segments, the calculating module 16 normalizes each difference to acquire a set of factors including a color factor $D_F$, a movement variable factor $D_{Avesum}$, a movement variable ratio factor $D_{AllTwisum}$ and a background variable factor $D_{Avesum\_back}$, in which the set of factors respectively corresponds to the set of features.

In step S106, in each one of the N segments, the calculating module 16 calculates a background variable ratio $\lambda$. In this embodiment, $$\lambda = \frac{D_{Avesum\_back}}{D_{Avesum}}.$$

In step S107, the calculating module 16 calculates an abnormal or security-significant value F of each one of the N segments, according to the background variable ratio $\lambda$ and the set of factors of each segment.

In one embodiment, first, the calculating module 16 sets a predetermined threshold$^\tau$. Second, before calculating the abnormal value F of a segment, the calculating module 16 compares the background variable ratio $\lambda$ of aforesaid segment with the predetermined threshold$^\tau$. Third, the calculating module 16 calculates the abnormal value F of the segment according to the comparison.

In detail, if the calculating module 16 determines that $\lambda<\tau$, $F=\alpha_1 D_F+(1-\lambda)\times\alpha_2(D_{Avesum}+D_{AllTwisum})$; if the calculating module 16 determines that $\lambda\geq\tau$, $F=\lambda\times\alpha_1 D_F+\alpha_2(D_{Avesum}+D_{AllTwisum})$. Those skilled in the art understand that these operations are exemplified for understanding but not so as to limit the scale of the present disclosure.

In step S108, the calculating module 16 determines one or more abnormal segments from the N segments according to the abnormal weighted values F of the segments. In one embodiment of the present disclosure, the segment with biggest abnormal value F is determined to be abnormal or security-significant. In another embodiment, several segments with abnormalities which are a factor of F bigger than other segments, or where their segments have exceeded a threshold, are determined as abnormal segments. The abnormal segments may be combined together or left separate, and then output to a display (not shown).

The system and the method of the present disclosure can apply to video surveillance and conquer the manpower inefficiency when the video has a dynamic background.

Although the present disclosure has been specifically described on the basis of this exemplary embodiment, the disclosure is not to be construed as being limited thereto.

Various changes or modifications may be made to the embodiment without departing from the scope and spirit of the disclosure.

What is claimed is:

1. A computerized system, comprising:
one or more processors; and
a memory storing one or more programs for execution by the one or more processors, the one or more programs including:
  a dividing unit operable that divides a video into a plurality of segments;
  a feature extracting module that extracts a set of features of each segment, wherein the set of features comprises a color variable feature, a movement variable feature, a background variable feature, and a movement ratio variable feature; and
  a calculating module that calculates a set of factors of each segment according to the set of features of each segment, calculates an abnormal value of each segment based on the set of factors of each segment, and determines one or more abnormal segments of the video according to the abnormal value of each segment;
wherein the feature extracting module further calculates a background variable ratio of each segment while the background variable ratio is a ratio of the factor corresponding to the background variable feature and the factor corresponding to the movement variable feature; and
  the abnormal value is calculated based on the background variable ratio and the factors corresponding to the color variable feature, the movement variable feature and the movement ratio variable ratio feature, and the movement ratio variable feature is extracted based on a number of times that a rate of change between each two continuous frames of a segment has exceeded a predetermined threshold.

2. The system claimed in claim 1, wherein the color variable feature is extracted based on accumulated histogram.

3. The system claimed in claim 1, wherein the movement variable feature is extracted based on differential operation of the frames of the segment, and the background variable ratio feature is extracted based on differential operation of background information extracted from the frames of the segment according to Gaussian mixture model.

4. A method of detecting abnormal segments of a video, performed by a computerized system having one or more processors and a memory storing one or more programs for execution by the one or more processors, the method comprising:
dividing the video into N segments by the one or more processors;
extracting, by the one or more processors, a set of features of each segment to acquire N of each kind of features, wherein the set of features comprises a color variable feature, a movement variable feature, a background variable feature, and a movement ratio variable feature;
respectively averaging N of each kind of features to acquire a feature average corresponding to each kind of features by the one or more processors;
normalizing, by the one or more processors, each difference between the feature average and corresponding feature of each segment to acquire a set of factors related to each segment, in which the factors respectively correspond to the features;

calculating an abnormal value of each segment according to the set of factors of each segment by the one or more processors;

determining one or more abnormal segments according to the abnormal values by the one or more processors; and calculating a background variable ratio of each segment by the one or more processors while the background variable ratio is a ratio of the factor corresponding to the background variable feature and the factor corresponding to the movement variable feature;

wherein the abnormal value is calculated based on the background variable ratio and the factors corresponding to the color variable feature, the movement variable feature and the movement ratio variable ratio feature, and the movement ratio variable feature is extracted based on a number of times that a rate of change between each two continuous frames of a segment has exceeded a predetermined threshold.

5. The method claimed in claim 4, wherein the color variable feature is extracted based on accumulated histogram.

6. The method claimed in claim 4, wherein the movement variable feature is extracted based on differential operation of the frames of the segment, and the background variable ratio feature is extracted based on differential operation of background information extracted from the frames of the segment according to Gaussian mixture model.

\* \* \* \* \*